US008537396B2

(12) United States Patent  
Miyazaki (10) Patent No.: US 8,537,396 B2  
(45) Date of Patent: *Sep. 17, 2013

(54) PRINT DOCUMENT CONVERSION APPARATUS, PRINT DOCUMENT CONVERSION METHOD, AND COMPUTER READABLE MEDIUM

(75) Inventor: Koichi Miyazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 350 days.

This patent is subject to a terminal disclaimer.

(21) Appl. No.: 13/019,736

(22) Filed: Feb. 2, 2011

(65) Prior Publication Data

US 2012/0013925 A1 Jan. 19, 2012

(30) Foreign Application Priority Data

Jul. 14, 2010 (JP) ................................. 2010-159619

(51) Int. Cl.
*G06F 3/12* (2006.01)
*G06K 15/00* (2006.01)

(52) U.S. Cl.
USPC .................. 358/1.15; 358/1.13; 358/1.18

(58) Field of Classification Search
None
See application file for complete search history.

(56) References Cited

U.S. PATENT DOCUMENTS

| 5,333,246 A * | 7/1994 | Nagasaka ..................... 345/619 |
| 2003/0095282 A1* | 5/2003 | Suzuki et al. ................. 358/1.15 |
| 2009/0153892 A1* | 6/2009 | Torii ............................ 358/1.13 |
| 2012/0013940 A1* | 1/2012 | Miyazaki ..................... 358/1.15 |

FOREIGN PATENT DOCUMENTS

| JP | A-2006-7496 | 1/2006 |
| JP | A-2009-269179 | 11/2009 |

* cited by examiner

*Primary Examiner* — Dov Popovici
(74) *Attorney, Agent, or Firm* — Oliff & Berridge, PLC (57) ABSTRACT

A print document conversion apparatus includes a plurality of software-based conversion units and a controller. The plurality of software-based conversion units perform a software-based conversion process for converting print document data described in a page description language into page image data having a bitmap image format. Each of the plurality of software-based conversion units requests a hardware-based image processing apparatus that executes specific image processing in the software-based conversion process to execute the specific image processing, and generates the page image data including a result of the image processing executed by the hardware-based image processing apparatus in response to the request. The controller activates an additional software-based conversion unit that performs the software-based conversion process when a state where at least one of the plurality of software-based conversion units waits for the hardware-based image processing apparatus to complete the image processing possibly occurs.

5 Claims, 7 Drawing Sheets

PRINT DOCUMENT CONVERSION APPARATUS, PRINT DOCUMENT CONVERSION METHOD, AND COMPUTER READABLE MEDIUM

CROSS-REFERENCE TO RELATED APPLICATIONS

This application is based on and claims priority under 35 USC 119 from Japanese Patent Application No. 2010-159619 filed Jul. 14, 2010.

BACKGROUND (i) Technical Field

The present invention relates to a print document conversion apparatus, a print document conversion method, and a computer readable medium storing a program.

(ii) Related Art

Print data written in a page description language (PDL) such as PostScript (registered trademark) or Portable Data Format (PDF) (published as ISO 32000-1) is converted into a bitmap image (also referred to as a raster image) by a conversion module called a raster image processor (RIP), and is printed by a printer. The conversion module is responsible for language processing such as PDL interpretation, and is generally implemented by software.

However, some of the processes performed by a RIP, such as image processing on a bitmap image object (for example, color space conversion, rotation, and enlargement/reduction), may be executed at a higher speed by using a dedicated hardware-based image processing circuit than by performing software processing using a general-purpose computer. A system in which a software-based RIP module requests a hardware-based image processing circuit to perform image processing has been proposed.

Also, the recent growth of multi-core processors may make it possible to parallelize RIP software to run on multiple processor cores to increase the processing speed. In a configuration in which the number of hardware-based image processing apparatuses is smaller than the number of processor cores on which RIP software is parallelized to run, when a certain RIP software task among the RIP software tasks executed in parallel requests an image processing apparatus to perform image processing, the request may not necessarily be processed immediately if all the image processing apparatuses have already started processing other requests. While a RIP software task waits for processing performed by an image processing apparatus to be completed, the processor that executes the RIP software task is in a wait state without performing processing.

SUMMARY

According to an aspect of the invention, there is provided a print document conversion apparatus including a plurality of software-based conversion units and a controller. The plurality of software-based conversion units perform a software-based conversion process for converting print document data described in a page description language into page image data having a bitmap image format. Each of the plurality of software-based conversion units requests a hardware-based image processing apparatus that executes specific image processing in the software-based conversion process to execute the specific image processing, and generates the page image data including a result of the image processing executed by the hardware-based image processing apparatus in response to the request. The controller activates an additional software-based conversion unit that performs the software-based conversion process when a state where at least one of the plurality of software-based conversion units waits for the hardware-based image processing apparatus to complete the image processing possibly occurs.

BRIEF DESCRIPTION OF THE DRAWINGS

Exemplary embodiment(s) of the present invention will be described in detail based on the following figures, wherein.

DETAILED DESCRIPTION

Exemplary embodiments of the present invention will be described hereinafter with reference to the drawings. In figures, the same or similar components are assigned the same reference numerals.

First, an example of a system including a print data conversion apparatus according to an exemplary embodiment will be described with reference to FIG. 1. The system includes a print data conversion apparatus 100, a host computer 140, a print control apparatus 160, and a printer engine 170.

The print data conversion apparatus 100 is an apparatus configured to convert print document data written in PDL into print image data such as bitmap image data acceptable by the printer engine 170. The host computer 140 sends print document data to the print data conversion apparatus 100 via a network such as a local area network (LAN) 130, and instructs the print data conversion apparatus 100 to print the print document data.

The print data conversion apparatus 100 includes a controller 110. The controller 110 includes communication controllers 112 and 120 that are connected to each other so as to be communicable with each other via a local bus 122, a multi-CPU 114, a local memory 116, and a secondary storage device 118. The communication controller 112 is a device configured to perform data communication with the host computer 140 via the LAN 130. For example, the communication controller 112 receives a print instruction or print document data from the host computer 140, or exchanges print control information with the host computer 140. The multi-CPU 114 may be a processor package having multiple CPU cores. The local memory 116 is a main memory that is used as, for example, a work area by each CPU core of the multi-CPU 114, and may be, for example, a random access memory or the like. The secondary storage device 118 may be a non-volatile storage device having a relatively large capacity such as a hard disk device or an electrically erasable programmable read only memory (EEPROM), and stores a program executed by the multi-CPU 114, print document data received from the host computer 140, and the like. A control program describing the content of processes of various functional modules such as RIP modules 210 described below is stored in, for example, the secondary storage device 118, and is executed by the multi-CPU 114. A fraction of the control program may be executed in parallel by plural CPU cores of the multi-CPU 114. The multi-CPU 114 executes the control program to covert print document data into print image data of respective pages. The communication controller 120 is a device configured to perform data communication with the print control apparatus 160 via a network called an intra-system network 150. In the illustrated example, the print data conversion apparatus 100 and the print control apparatus 160 (and the printer engine 170) are interconnected via the intra-system network 150 to construct a single printing system. The print image data of respective pages generated by the processing of the multi-CPU 114 is transmitted to the print control apparatus 160 via the communication controller 120 and the intra-system network 150.

An image processing apparatus 125 is an apparatus including a hardware-based image processing circuit dedicated to image processing, such as a graphic accelerator. The hardware-based image processing circuit has a circuit configuration for executing at least one of various bitmap image processing operations such as color space conversion, enlargement/reduction of an image, rotation of an image, and halftone processing. The image processing apparatus 125 may be connected as, for example, an add-on board to a slot provided in, for example, the local bus 122 of the controller 110.

A RIP processing program (a RIP module 210 described below) executed by the multi-CPU 114 may be used to request the image processing apparatus 125 to perform image processing or the like and to create page image data upon receipt of the processing result. However, as described below, the RIP module 210 is also capable of executing the same image processing by itself using software.

The printer engine 170 is a hardware printing component that prints an image represented by print image data on paper using a coloring agent such as ink or toner. The print control apparatus 160 is an apparatus configured to control the printer engine 170, and includes a communication controller 162, a page controller 164, and an engine controller 166. The communication controller 162 communicates with the print data conversion apparatus 100 via the intra-system network 150 to receive print image data of respective pages or exchange various control information necessary for print control. The page controller 164 accumulates the received print image data of respective pages, and sends the print image data of respective pages to the engine controller 166 in accordance with the print order. The engine controller 166 supplies the received print image data of respective pages to the printer engine 170. The printer engine 170 prints the received print image data on paper.

Figure 1:
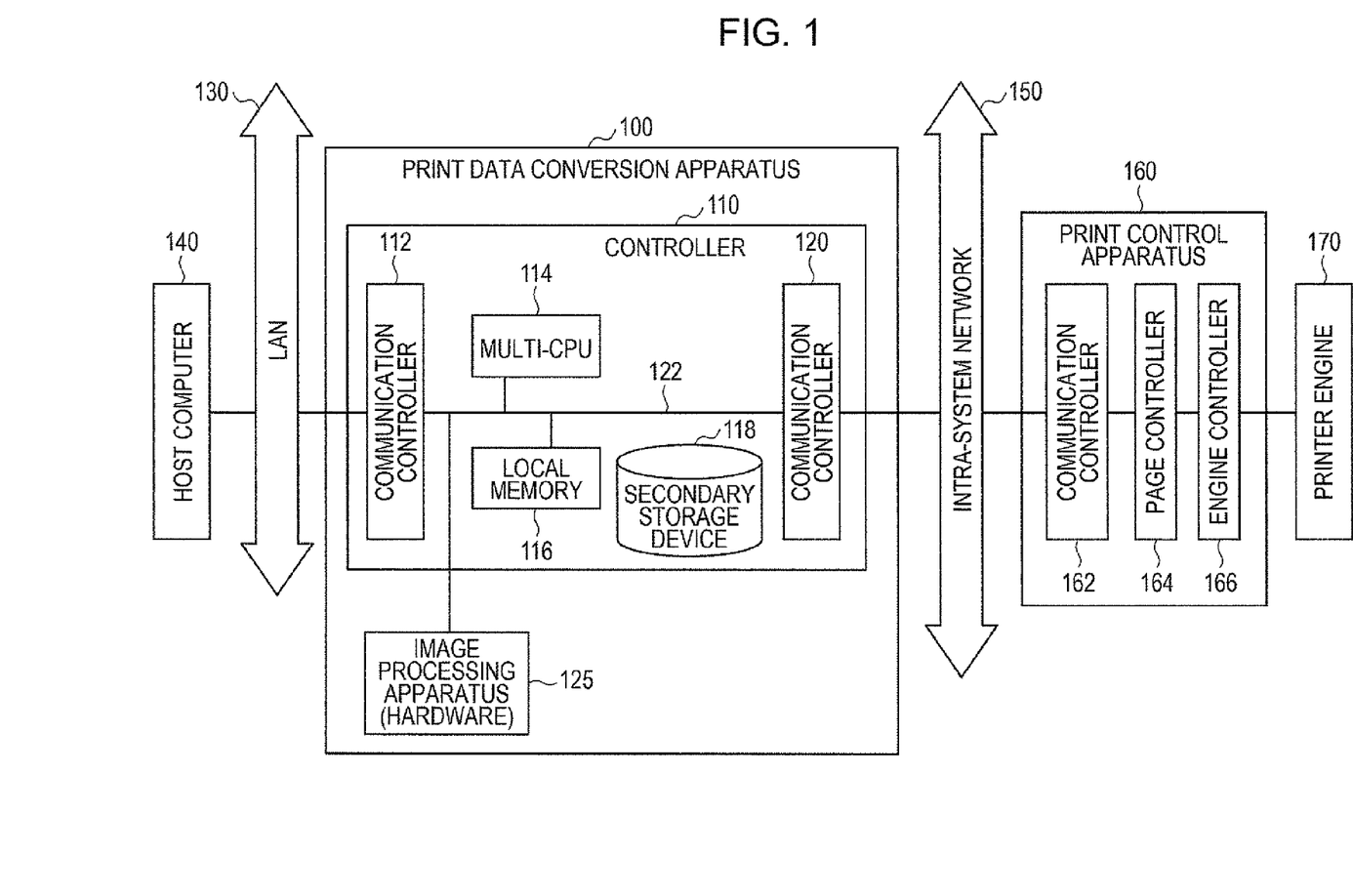
FIG. 1 illustrates an example hardware configuration of a printing system including an apparatus according to an exemplary embodiment.
Figure 2:
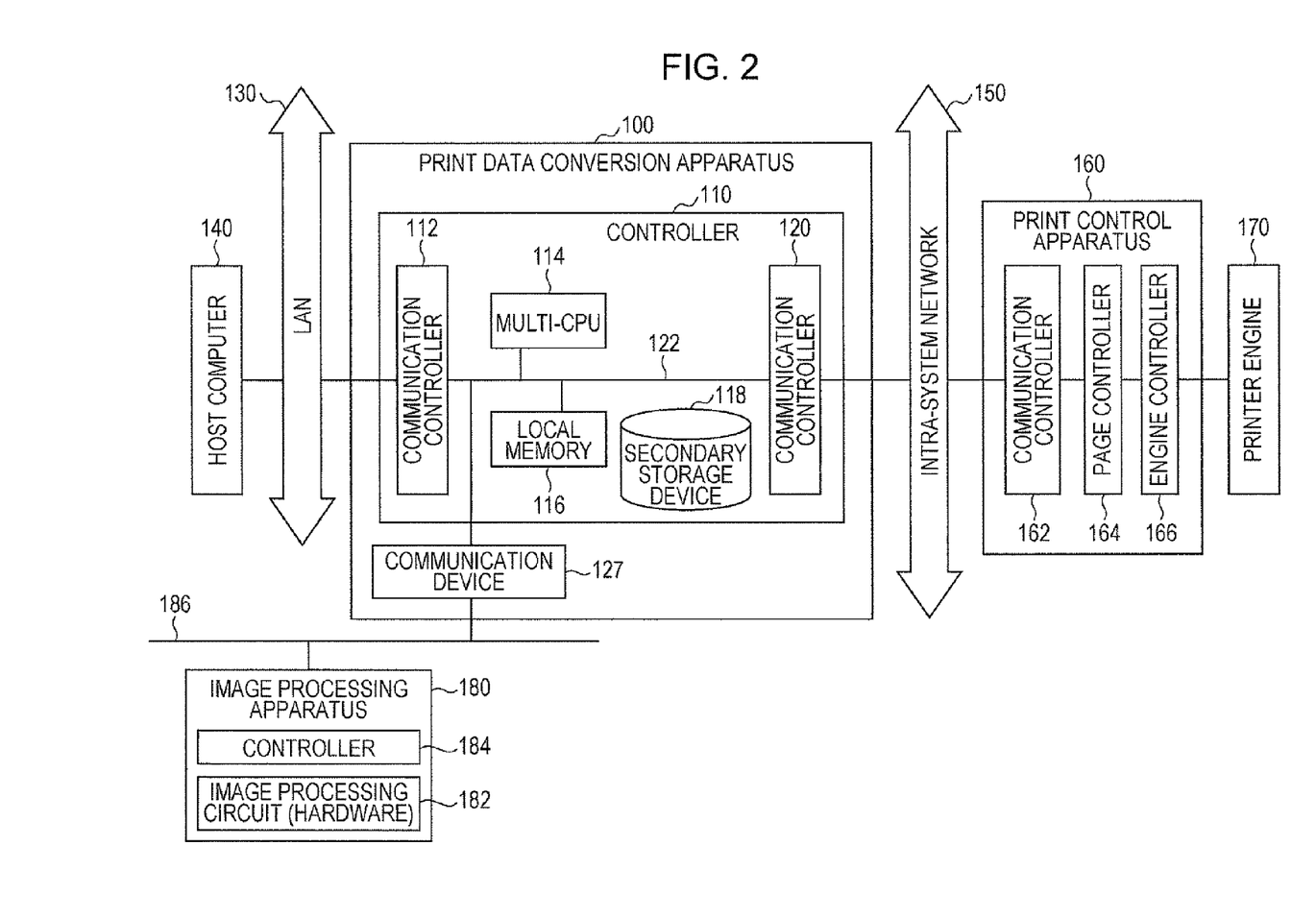
FIG. 2 illustrates another example hardware configuration of the printing system including the apparatus according to the exemplary embodiment.

FIG. 2 illustrates another example of the system including the apparatus according to the exemplary embodiment. In the example illustrated in FIG. 1, the image processing apparatus 125 is provided within the print data conversion apparatus 100. In the example illustrated in FIG. 2, in contrast, an image processing apparatus 180 including an image processing circuit 182 that is similar to the hardware-based image processing circuit included in the image processing apparatus 125 is provided outside the print data conversion apparatus 100. The image processing apparatus 180 is connected to a network 186 to which a communication device 127 included in the print data conversion apparatus 100 is connected, and receives an image processing request from the print data conversion apparatus 100 or returns an image processing result to the print data conversion apparatus 100 via the network 186. The network 186 may be the same network as the intra-system network 150 (or the LAN 130), and, in this case, the communication device 127 may be the same as the communication controller 120 (or 112). The image processing apparatus 180 further includes a controller 184 configured to perform operations such as communication via the network 186 and management of requests from the print data conversion apparatus 100.

Next, an example of the functional module configuration of the print data conversion apparatus 100 according to the exemplary embodiment will be described with reference to FIG. 3. The functional module configuration of the print data conversion apparatus 100 illustrated by way of example in FIG. 3, except for an image processing apparatus 220, is implemented by executing a control program using the multi-CPU 114 of the controller 110.

Figure 3:
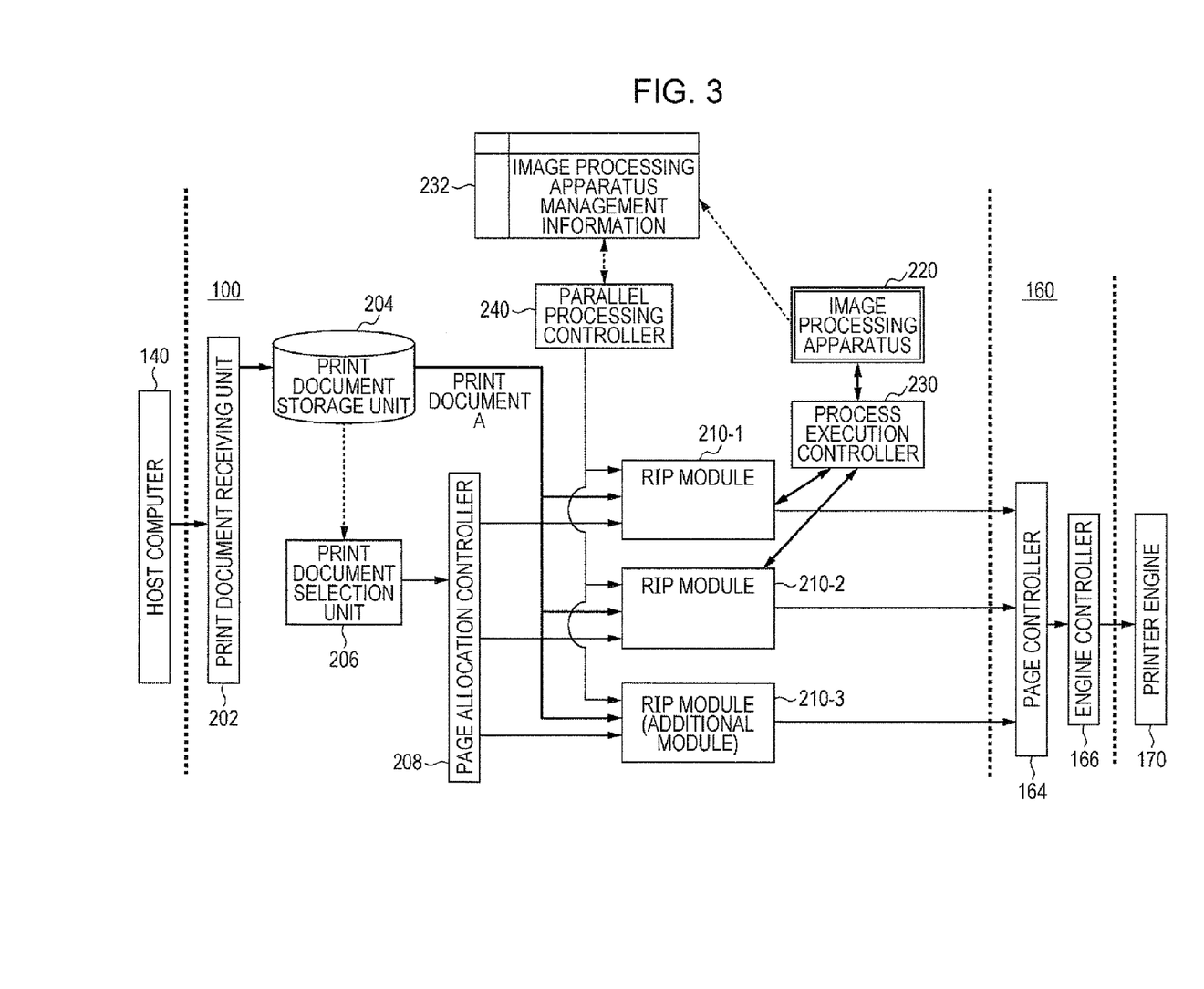
FIG. 3 is a functional block diagram illustrating an example of a print data conversion apparatus according to the exemplary embodiment.

In FIG. 3, a print document receiving unit 202 receives print document data from the host computer 140. A print document storage unit 204 stores PDL print document data received from the host computer 140. The print document data may be, for example but not limited to, data described in page independent PDL (for example, PDF). The term "page independent" means that information describing print image data of a page is represented only by PDL data regarding the page and is not dependent on PDL data regarding other pages. The print document storage unit 204 may store plural pieces of print document data together with information about, for example, the print order. A print document selection unit 206 selects an object to be printed from the print document data stored in the print document storage unit 204. For example, each time print processing that is currently being executed is completed, next print document data is selected as an object to be printed in accordance with print order information.

A page allocation controller 208 allocates different pages in the print document data to RIP modules 210-1 to 210-3 (hereinafter generally referred to as a "RIP module 210" or "RIP modules 210" unless otherwise specified individually). The method of allocation is not particularly limited. For example, pages may be allocated to the RIP modules 210 in a fixed manner in order, starting from the top page, in accordance with the numbers of the RIP modules 210, or may be allocated dynamically in order, starting from the RIP module 210 that has completed its page conversion processing. The page allocation may be performed by, for example, causing the page allocation controller 208 to notify the RIP modules 210 of the page numbers to be allocated.

Each of the RIP modules 210 converts data of a page specified by the page allocation controller 208 within print document data to be printed, which is selected by the print document selection unit 206, into print image data. Specifically, each of the RIP modules 210 interprets PDL data of a specified page in order starting from the beginning, and renders (or rasterizes) the data on a page memory to generate print image data of the page. It is to be noted that print document data in the PDF format includes index information of the PDL data of the pages included in the document. Each of the RIP modules 210 may obtain PDL data of the page corresponding to the page number specified by the page allocation controller 208 by referring to the index information in the print document data stored in the print document storage unit 204.

The RIP modules 210 may be software-based modules configured to interpret print document data described in PDL and to convert the print document data into a bitmap (or raster) image acceptable by the printer engine 170. For example, upon detection of a rendering command for rendering an image object such as a font, an image, or a form during the interpretation of PDL data of the allocated pages in order starting from the beginning, each of the RIP modules 210 executes the rendering command, and writes a pixel value in a storage area of an individual pixel, which is reserved on the local memory 116, in accordance with the command. Further, each of the RIP modules 210 has a function of executing image processing such as color space conversion, rotation, enlargement/reduction, and halftone processing on a bitmap image formed in the above manner in accordance with a command or setting in the PDL data.

The RIP modules 210-1 to 210-3 are implemented as devices configured to execute the processes described above by causing individual CPU cores of the multi-CPU 114 to execute a program group describing the processes described above. The RIP modules 210-1 to 210-3 are executed by the CPU cores as processes or threads. In a typical example, a single CPU core executes one RIP module 210. However, any other configuration may be used, and, for example, a single CPU core may execute multiple RIP modules 210. In FIG. 3, by way of example, three RIP modules 210 are executed. The number of RIP modules 210 to be executed in the print data conversion apparatus 100 is determined by a parallel processing controller 240 described below.

As described above, each of the RIP modules 210 is capable of executing image processing by itself. However, the image processing apparatus 220 that is a hardware component dedicated to the image processing generally provides higher speed processing. Thus, in a basic operation, if RIP processing involves image processing to be performed, each of the RIP modules 210 requests the image processing apparatus 220 to perform image processing. However, as described below, if plural RIP modules 210 request the image processing apparatus 220, which is a hardware component, to perform image processing, the RIP modules 210 wait for processing performed by the image processing apparatus 220 to be completed, which may thus lead to the state where the CPU cores of the multi-CPU 114 do not execute RIP processing. In order to efficiently use the CPU cores in this state, in this exemplary embodiment, as described in detail below, control is performed so that an additional RIP module 210 is activated in addition to the RIP modules 210 that request the image processing apparatus 220 to perform image processing and is caused to execute image processing. In FIG. 3, the RIP module 210-3 is an example of an additional RIP module that is activated.

As described above, in this exemplary embodiment, plural RIP modules 210 perform RIP processing on plural pages in parallel. Upon completion of a process for converting PDL data of one page, each of the RIP modules 210 supplies print image data of the page, which is formed on a page image memory, to the printer engine 170 via the print control apparatus 160.

The image processing apparatus 220 is an apparatus in which a hardware-based image processing circuit executes the same image processing as the image processing based on software processing of the RIP modules 210, and may correspond to the image processing apparatus 125 illustrated in FIG. 1 or the image processing apparatus 180 illustrated in FIG. 2. In the example illustrated in FIG. 1, by way of example, the image processing apparatus 220 includes one hardware-based image processing circuit capable of executing processing similar to the image processing based on software processing of the RIP modules 210.

A process execution controller 230 receives a request for performing image processing which is issued from a RIP module 210 to the image processing apparatus 220, and causes the image processing apparatus 220 to execute the requested image processing. When the image processing performed by the image processing apparatus 220 is completed, the process execution controller 230 passes the image processing result to the requesting RIP module 210.

Since the image processing apparatus 220 performs hardware processing, the processing speed of the image processing apparatus 220 is higher than that obtained when each individual RIP module 210 performs the same processing using software processing. If the image processing apparatus 220 receives a request from a certain RIP module 210 to perform image processing while executing image processing requested by another RIP module 210, the image processing apparatus 220 starts the later requested image processing after the completion of the earlier requested image processing. Thus, if plural RIP modules 210 request the image processing apparatus 220 to perform image processing, all the RIP modules 210 may wait for the processing performed by the image processing apparatus 220 to be completed. In this case, the CPU cores of the multi-CPU 114 that execute the RIP modules 210 do not execute RIP processing until one of the RIP modules 210 resumes RIP processing upon receipt of an image processing result from the image processing apparatus 220. The activation of an additional RIP module 210 allows efficient use of the CPU cores in the above case.

The parallel processing controller 240 determines the number of RIP modules 210 that are executed in the print data conversion apparatus 100. The parallel processing controller 240 also controls each of the RIP modules 210 to determine whether to request the image processing apparatus 220 to perform image processing or to execute image processing by itself. The control operation of the parallel processing controller 240 is performed by referring to image processing apparatus management information 232.

The image processing apparatus management information 232 may be management information that the control operation of the parallel processing controller 240 is based on. The image processing apparatus management information 232 includes information regarding the processing capability of the image processing apparatus 220. The image processing apparatus management information 232 includes, for example, the number of available image processing apparatuses 220 in the print data conversion apparatus 100, and the number of image processing circuits provided in each of the image processing apparatuses 220. The term "available image processing apparatus 220", as used herein, means an image processing apparatus that is available to execute image processing in response to a request from the RIP modules 210, and may be provided within (the image processing apparatus 125 illustrated in FIG. 1) or outside (the image processing apparatus 180 illustrated in FIG. 2) the print data conversion apparatus 100. In the examples illustrated in FIGS. 1 to 3, the image processing apparatus management information 232 includes value "1" indicating the number of available image processing apparatuses 220. In the examples illustrated in FIGS. 1 to 3, the image processing apparatus management information 232 also includes value "1" indicating the number of image processing circuits provided in one image processing apparatus 220. The image processing apparatus management information 232 according to this exemplary embodiment further includes an image processing capability index indicating, for each of image processing circuits included in an available image processing apparatus 220, the ratio of the processing capability of the image processing circuit to the processing capability of one of the RIP modules 210. Here, the term "processing capability" means the time required to process a certain unit amount of image data (that is, the processing speed). The image processing capability index may also be a value indicating how many times the processing capability of an image processing circuit is greater than that of a RIP module 210. For example, if an image processing circuit is capable of executing certain image processing within one half the period of time required for a RIP module 210 to perform the same image processing, the image processing circuit has an image processing capability index of "2". Image processing capability indices may be determined using, for example, an experiment or the like for causing the image processing apparatus 220 and the RIP modules 210 to process a test image and measuring the processing time, and may be registered in the print data conversion apparatus 100. Here, for ease of illustration, it is assumed that the RIP modules 210 have the same processing capability. The RIP modules 210 may also have different processing capabilities. In this case, the image processing capability index regarding the image processing apparatus 220 for each RIP module 210 may be incorporated in the image processing apparatus management information 232. In the illustrated examples in FIGS. 1 to 3, by way of example, one image processing circuit provided in the image processing apparatus 220 has an image processing capability index of "2". Instead of the value of the image processing capability index, information that is used to determine the value of the image processing capability index may be incorporated in the image processing apparatus management information 232. Examples of the information that is used to determine the value of the image processing capability index include a value representing the processing capability of each image processing circuit of the image processing apparatus 220 and each of the RIP modules 210. The value of the image processing capability index may be determined by determining the ratio of the above values.

By referring to the image processing apparatus management information 232 as described above, the parallel processing controller 240 determines a total image processing capability index of individual image processing circuits in an available image processing apparatus 220. In the above example illustrated in FIGS. 1 to 3, one image processing apparatus 220 including one image processing circuit is available, and the image processing circuit has an image processing capability index of "2". Therefore, the total image processing capability index is given by 2=1 (the number of image processing circuits)×2 (the image processing capability index of the image processing circuit). In this exemplary embodiment, the parallel processing controller 240 determines that a number of (in this example, two) RIP modules 210 corresponding to the total image processing capability index are to be activated. If the total image processing capability index is not an integer, a number of RIP modules 210 corresponding to an integer obtained by, for example, rounding up, rounding down, or rounding off a decimal part may be activated. The total image processing capability index may be regarded as being a value representing the number of RIP modules 210 corresponding to the processing capability of image processing circuits available in the print data conversion apparatus 100. Thus, even if RIP modules 210, the number of which corresponds to the total, are activated and request the image processing apparatus 220 to perform image processing, the possibility that the time required for completion of the overall processing is longer than that obtained when the same number of RIP modules 210 execute the same image processing is considered low. However, since plural RIP modules 210 per image processing circuit make requests for performing image processing, as described above, at least one of the plural RIP modules 210 waits for the completion of image processing, and a CPU core that does not execute RIP processing may exist. To efficiently use CPU cores, the parallel processing controller 240 determines the number of additional RIP modules 210 to be activated in addition to RIP modules 210 the number of which corresponds to the total image processing capability index. The number of additional RIP modules 210 may be made equal to, for example, the number of image processing circuits. Alternatively, the number of additional RIP modules may be determined based on the number of CPU cores provided in the multi-CPU 114. For example, the number of additional RIP modules may be less than the number of CPU cores, or may be equal to, for example, the number of CPU cores. This allows full use of the CPU core performance even if all the RIP modules that may use an image processing apparatus have issued requests to the image processing apparatus and are waiting.

Furthermore, the parallel processing controller 240 according to this exemplary embodiment controls a number of RIP modules 210 corresponding to the total image processing capability index to request the image processing apparatus 220 to perform image processing while controlling an additionally activated RIP module 210 to execute image processing by itself without issuing a request to the image processing apparatus 220. For example, the parallel processing controller 240 instructs a number of RIP modules 210 corresponding to the total image processing capability index to request the image processing apparatus 220 to perform image processing when the RIP modules 210 are activated, and instructs an additional RIP module 210 to execute image processing by itself when the additional RIP module 210 is activated. Each of the RIP modules 210 requests the image processing apparatus 220 to perform image processing or execute image processing by itself in accordance with the instruction from the parallel processing controller 240. Hereinafter, a RIP module 210 that requests the image processing apparatus 220 to perform image processing may also be referred to as a "hardware-usable RIP module", and an additional RIP module 210 that executes image processing by itself may also be referred to as a "hardware-unusable RIP module". In the example illustrated in FIG. 3, the RIP modules 210-1 and 210-2 are hardware-usable RIP modules, and the RIP module 210-3 is a hardware-unusable RIP module.

The parallel processing controller 240 activates hardware-usable RIP modules and hardware-unusable RIP modules, the numbers of which are determined in the way described above, thus allowing the hardware-unusable RIP modules to be executed even if the hardware-usable RIP modules are waiting for image processing performed by the image processing apparatus 220 to be completed. Therefore, the possibility that a CPU core does not perform RIP processing is reduced.

An example configuration of a system including a print data conversion apparatus according to an exemplary embodiment and the control of parallel RIP processing, which is performed by the print data conversion apparatus, have been described with reference to FIGS. 1 to 3. The print document selection unit 206, the page allocation controller 208, the process execution controller 230, and the parallel processing controller 240 described above are executed by any of the CPU cores in the multi-CPU 114. A description will now be given of an example of the operation of the print data conversion apparatus 100.

Figure 4:
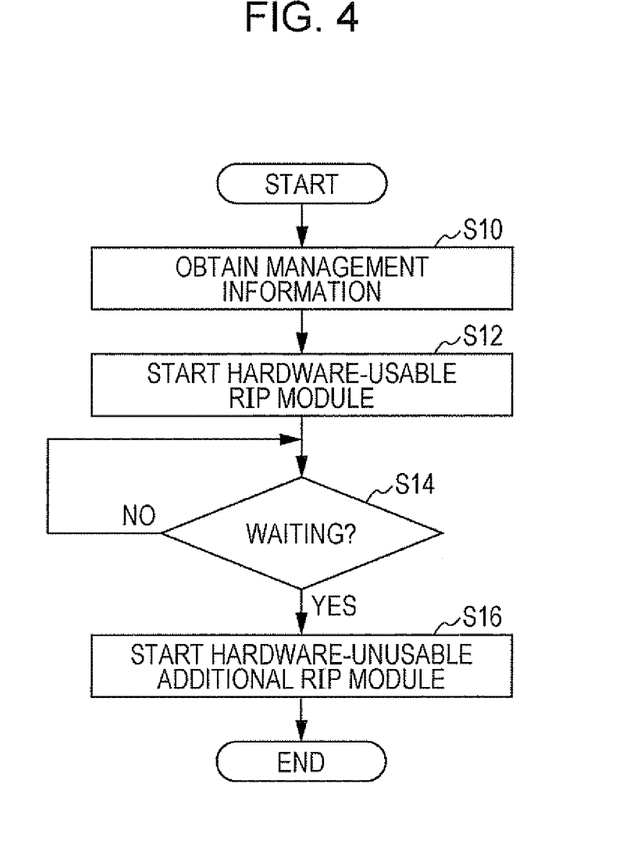
FIG. 4 is a flowchart illustrating an example of a processing procedure of a parallel processing controller.

FIG. 4 is a flowchart illustrating an example of a processing procedure performed by the parallel processing controller 240. When the power supply (not illustrated) of the print data conversion apparatus 100 is turned on and the print data conversion apparatus 100 is activated, the parallel processing controller 240 starts the process of the procedure in the example illustrated in FIG. 4.

First, the parallel processing controller 240 obtains image processing apparatus management information 232 (step S10). In the example described above with reference to FIG. 3, in step S10, image processing apparatus management information 232 including that one image processing apparatuses 220 is available, one image processing circuit is provided in the image processing apparatus 220, and the image processing circuit has an image processing capability index of "2" is obtained.

Then, the parallel processing controller 240 determines the number of hardware-usable RIP modules 210, and activates the determined number of RIP modules 210 (step S12). In this case, the parallel processing controller 240 instructs the RIP modules 210 that are activated to request the image processing apparatus 220 to perform image processing. In the example described above with reference to FIG. 3, in step S12, the RIP modules 210-1 and 210-2 are activated. When the print data conversion apparatus 100 receives a print instruction from the host computer 140, the page allocation controller 208 allocates pages for which RIP processing of print document data is to be performed to the RIP modules 210-1 and 210-2 activated in step S12. Each of the RIP modules 210-1 and 210-2 performs RIP processing for the corresponding page. If the RIP processing involves image processing, each of the RIP modules 210-1 and 210-2 requests the image processing apparatus 220 to perform image processing.

The parallel processing controller 240 monitors the operation of the RIP modules 210 until at least one of the RIP modules 210 activated in step S12 has started waiting for image processing performed by the image processing apparatus 220 to be completed (in process loop when NO is determined in step S14).

If at least one of the RIP modules 210 activated in step S12 has started waiting for image processing performed by the image processing apparatus 220 to be completed (YES in step S14), the parallel processing controller 240 activates an additional RIP module 210 (step S16). The parallel processing controller 240 controls the additional RIP module 210 that is activated to execute image processing by itself without requesting the image processing apparatus 220 to perform the image processing. The RIP module 210-3 illustrated in FIG. 3 is an example of the additional RIP module activated in step 316.

After step S16, the process of the parallel processing controller 240 ends. The page allocation controller 208 also allocates a page to the additional RIP module activated in step S16. The additional RIP module performs by itself all the RIP processing including the image processing for the corresponding page.

According to the procedure in the example of FIG. 4, a RIP module activated when a hardware-usable RIP module enters an image processing waiting state performs RIP processing including image processing by using software processing. Thus, the possibility that a CPU core in the multi-CPU 114 does not execute RIP processing is reduced. For example, in the example illustrated in FIG. 3, by way of example, the multi-CPU 114 that executes the RIP modules 210-1 to 210-3 includes two CPU cores, and one of the CPU cores executes one RIP module 210. In this example, even if the hardware-usable RIP module 210-1 that has requested the image processing apparatus 220 to perform image processing enters an image processing waiting state and one CPU core interrupts the RIP processing of RIP module 210-1, the CPU core is used to execute the RIP module 210-3 that is additionally activated. Further, even if the RIP module 210-2 also enters an image processing waiting state and the corresponding CPU core interrupts the RIP processing, the RIP processing based on software processing performed by the RIP module 210-3 is continued. Therefore, at least one of the two CPU cores of the multi-CPU 114 is executing RIP processing.

Figure 5:
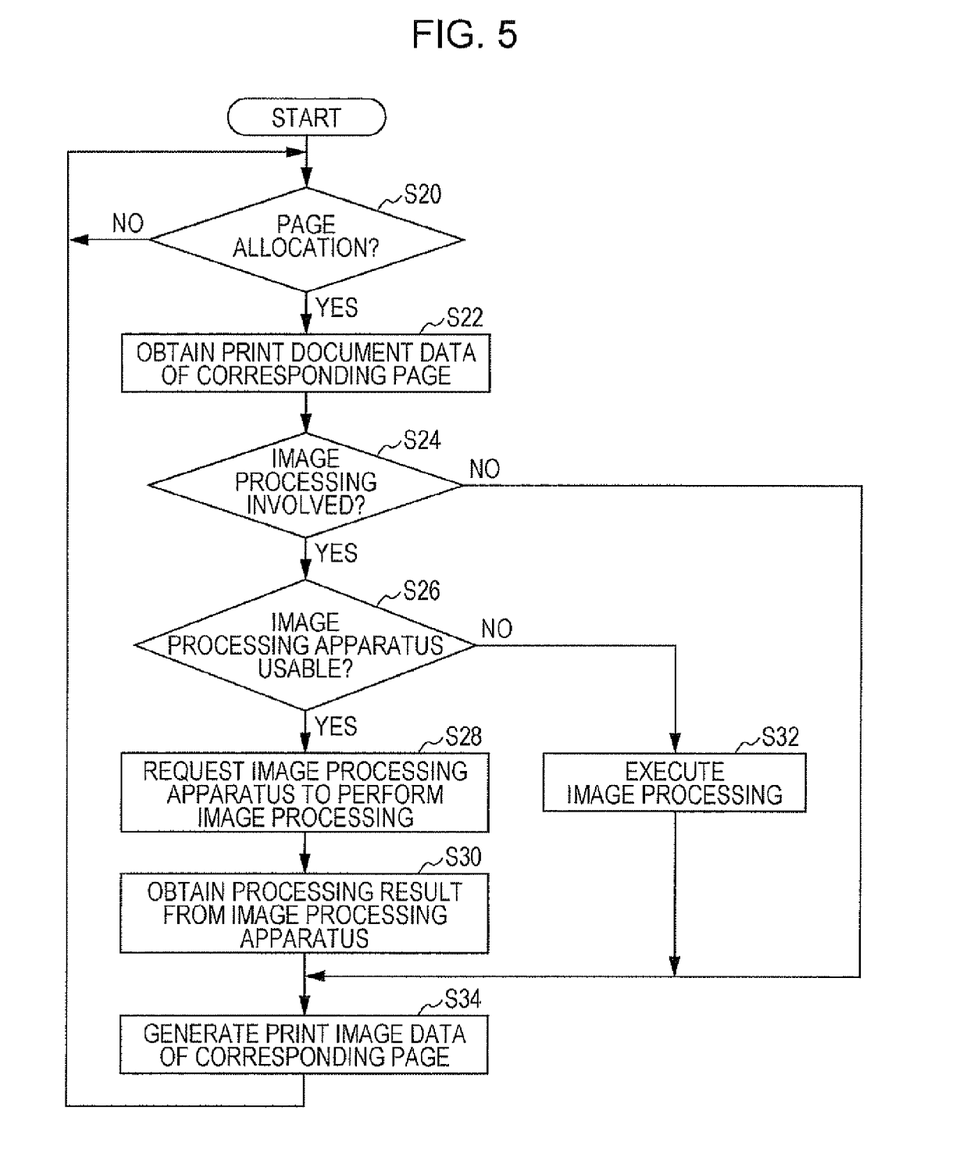
FIG. 5 is a flowchart illustrating an example of a processing procedure of a RIP module.

FIG. 5 is a flowchart illustrating an example of a processing procedure of each of the RIP modules 210. Each of the RIP modules 210 starts the process of the procedure in the example illustrated in FIG. 5 when activated by the parallel processing controller 240.

First, the RIP module 210 waits until a page is allocated by the page allocation controller 208 (in process loop when NO is determined in step S20).

When a page is allocated (YES in step S20), the RIP module 210 obtains print document data of the allocated corresponding page from the print document storage unit 204 (step S22).

The RIP module 210 interprets the obtained print document data, and determines whether or not RIP processing involves image processing (step S24).

If image processing is involved (YES in step S24), the RIP module 210 further determines whether or not the image processing apparatus 220 is usable (step S26). The determination in step S26 may be performed by determining whether the RIP module 210 has been instructed by the parallel processing controller 240 to request the image processing apparatus 220 to perform image processing or to execute image processing by itself. In other words, the determination is performed by determining whether the RIP module 210 has been activated as a hardware-usable RIP module or a hardware-unusable RIP module.

If the RIP module 210 has been instructed by the parallel processing controller 240 to request the image processing apparatus 220 to perform image processing (YES in step S26), the RIP module 210 requests the image processing apparatus 220 to perform the image processing involved in the RIP processing for the corresponding page (step S28). The RIP module 210 waits for the image processing apparatus 220 to complete the requested image processing, and, when the image processing is completed, obtains a processing result from the image processing apparatus 220 (step S30). For the RIP modules 210-1 and 210-2 illustrated in FIG. 3, YES is determined in step S26, and the processing of steps S28 and S30 is performed.

If the RIP module 210 has been instructed by the parallel processing controller 240 to execute image processing by itself (NO in step S26), the RIP module 210 executes image processing by itself (step S32). For the RIP module 210-3 illustrated in FIG. 3, NO is determined in step S26, and the processing of step S32 is performed.

The RIP module 210 generates print image data for the corresponding page using the image processing result obtained from the image processing apparatus in step S30 or a result of the image processing executed by itself in step S32 (step S34). If the RIP processing for the corresponding page involves no image processing (NO in step S24), in step S34, the RIP module 210 generates print image data for the corresponding page using RIP processing involving no image processing. The print image data generated in step S34 is passed to the page controller 164 of the print control apparatus 160.

After step S34, the process returns to step S20, and the RIP module 210 waits for the next page to be allocated.

Figure 6:
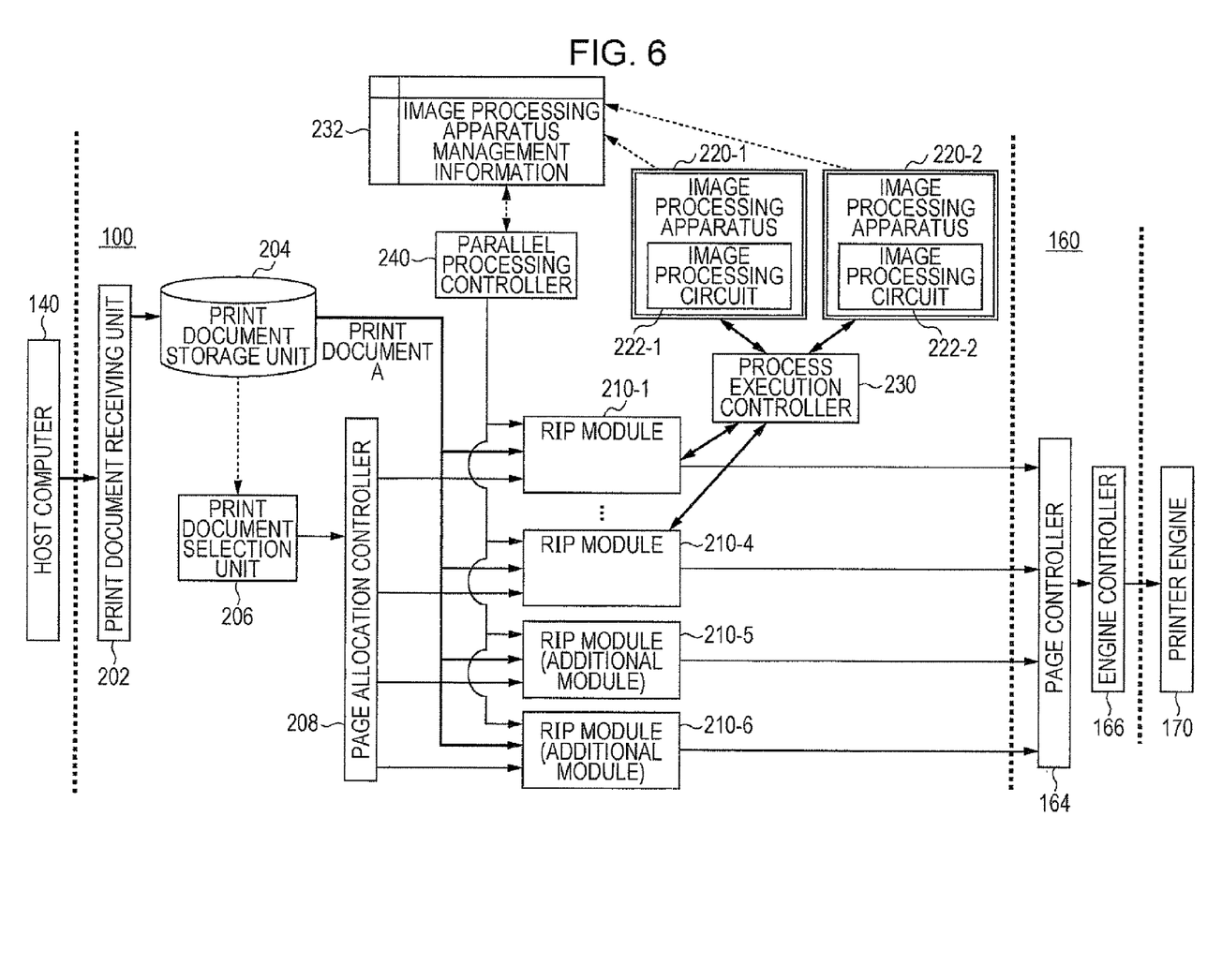
FIG. 6 is a functional block diagram illustrating another example of the print data conversion apparatus according to the exemplary embodiment.

An exemplary embodiment of the present invention has been described with reference to FIGS. 1 to 5 in the context in which one image processing apparatus 220 is available and the image processing apparatus 220 includes one image processing circuit, by way of example. It is to be understood that the number of image processing apparatuses 220 and the number of image processing circuits provided in each image processing apparatus 220 are not limited to those in the example described above. For example, as illustrated in FIG. 6, plural image processing apparatuses 220 may be available in the print data conversion apparatus 100. FIG. 6 illustrates an example in which two image processing apparatuses 220-1 and 220-2 each including one image processing circuit 222 (i.e., image processing circuits 222-1 and 222-2) are available in the print data conversion apparatus 100. Similarly to the examples described with reference to FIGS. 1 to 3, the image processing apparatuses 220-1 and 220-2 illustrated in FIG. 6 may be provided within or outside the print data conversion apparatus 100. In the example illustrated in FIG. 6, by way of example, the image processing apparatus management information 232 includes value "2" indicating the number of image processing apparatuses 220, value "1" indicating the number of image processing circuits 222 provided in each image processing apparatus 220, and value "2" indicating the image processing capability index of each of the image processing apparatuses 220-1 and 220-2. In the illustrated example, the total image processing capability index is "4", and the parallel processing controller 240 activates four hardware-usable RIP modules 210-1 to 210-4 (RIP modules 210-2 and 210-3 are not illustrated in FIG. 6). In the example illustrated in FIG. 6, furthermore, two hardware-unusable RIP modules 210-5 and 210-6 are activated.

Figure 7:
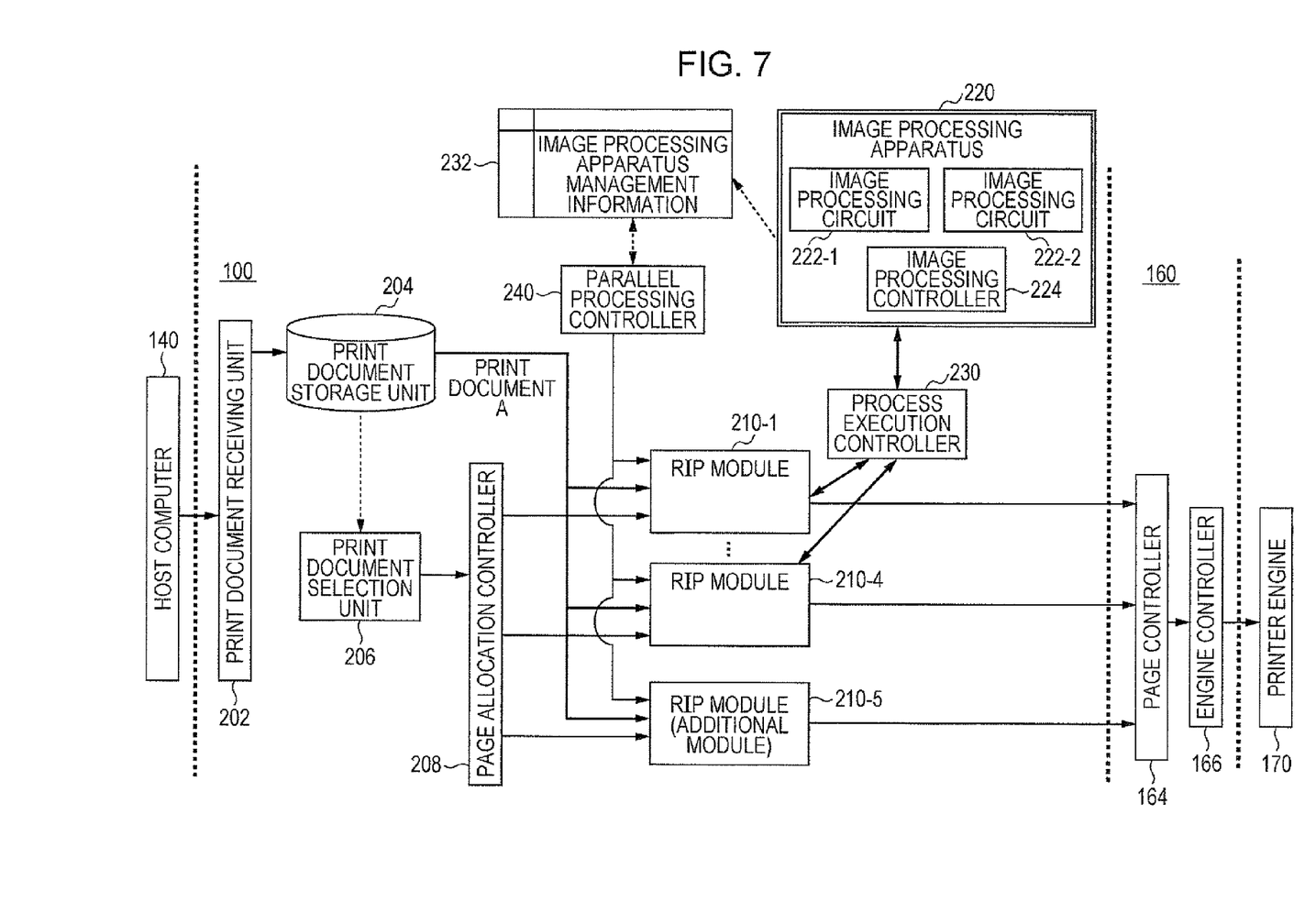
FIG. 7 is a functional block diagram illustrating still another example of the print data conversion apparatus according to the exemplary embodiment.

Further, in another example, as illustrated in FIG. 7, an image processing apparatus 220 including plural image processing circuits may be available. In FIG. 7, by way of example, one image processing apparatus 220 including two image processing circuits 222-1 and 222-2 is available. The image processing apparatus 220 also includes an image processing controller 224 that controls operations such as allocating processes to the two image processing circuits 222-1 and 222-2. The image processing controller 224 receives an image processing request from a RIP module 210 via the process execution controller 230, causes one of the image processing circuits 222-1 and 222-2 to execute the requested image processing, and returns a processing result to the process execution controller 230. In the example illustrated in FIG. 7, by way of example, the image processing apparatus management information 232 includes value "1" indicating the number of available image processing apparatuses 220, value "2" indicating the number of image processing circuits 222 provided in the image processing apparatus 220, and value "2" indicating the image processing capability index of each image processing circuit 222. In the illustrated example, the total image processing capability index is "4", and the parallel processing controller 240 activates four hardware-usable RIP modules 210-1 to 210-4 (RIP modules 210-2 and 210-3 are not illustrated in FIG. 7). In the example illustrated in FIG. 7, furthermore, one hardware-unusable RIP module 210-5 is activated.

In either example illustrated in FIG. 6 or 7, the parallel processing controller 240 and each of the RIP modules 210 may perform processes using a procedure similar to that described above with reference to FIGS. 4 and 5.

In the exemplary embodiment described above with reference to FIGS. 1 to 7, the number of hardware-usable RIP modules among RIP modules 210 executed by the print data conversion apparatus 100 is limited to the value indicating the image processing capability index of an image processing circuit. A number of additional RIP modules 210 exceeding the above value do not use the image processing apparatus 220.

Exemplary embodiments of the present invention are not limited to that described above with reference to FIGS. 1 to 7. For example, the parallel processing controller 240 according to the foregoing exemplary embodiment activates an additional hardware-unusable RIP module 210 at the time when at least one hardware-usable RIP module 210 enters a processing waiting start. However, an additional RIP module 210 may be activated at a different timing. In a modification, an additional RIP module 210 may be activated at the time when two or more hardware-usable RIP modules 210 enter a processing waiting state. In another modification, an additional RIP module 210 may be activated before a hardware-usable RIP module 210 actually enters an image processing waiting state. For example, both a hardware-usable RIP module 210 and a hardware-unusable RIP module 210 may be activated when the print data conversion apparatus 100 is activated. If the hardware-unusable RIP module 210 is activated at any of the timings described above as examples, CPU cores of the multi-CPU 114 that interrupt RIP processing because the hardware-usable RIP module 210 is in the processing waiting state may be used for the execution of the RIP processing of the hardware-unusable RIP module 210.

Furthermore, in the foregoing exemplary embodiment and modifications, after an additional RIP module 210 is activated, the page allocation controller 208 also allocates a page to the additional RIP module 210 in a manner similar to that allocated to a hardware-usable RIP module 210. In the foregoing exemplary embodiment and modifications, it may be determined whether or not a page is to be allocated to an additional RIP module 210 in accordance with whether or not a hardware-usable RIP module 210 is in the image processing waiting state. For example, the parallel processing controller 240 or the page allocation controller 208 may monitor the operation of a hardware-usable RIP module 210. The page allocation controller 208 may allocate a new page to an additional RIP module 210 if a RIP module 210 in the image processing waiting state exists, and not allocate a new page to an additional RIP module 210 if a RIP module 210 in the image processing waiting state does not exist. Alternatively, for example, in the procedure in the example illustrated in FIG. 4, after a hardware-usable RIP module 210 enters the processing waiting state and an additional RIP module 210 is activated (after step S16), the additional RIP module 210 may be terminated (or deleted) when the processing waiting state of the hardware-usable RIP module 210 is released. In this example, if any RIP processing is currently being executed by an additional RIP module 210 at the time when the processing waiting state is released, the additional RIP module 210 may be terminated after the RIP processing is completed. Furthermore, in this example, after the additional RIP module 210 is terminated, the process may return to the determination of step S14 in FIG. 4, and an additional RIP module 210 may be activated again at the time when a hardware-usable RIP module 210 enters a processing waiting state.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print document conversion apparatus comprising:
a plurality of software-based conversion units that perform a software-based conversion process for converting print document data described in a page description language into page image data having a bitmap image format, each of the plurality of software-based conversion units requesting a hardware-based image processing apparatus that executes specific image processing in the software-based conversion process to execute the specific image processing, and generating the page image data including a result of the specific image processing executed by the hardware-based image processing apparatus in response to the request; and
a controller that activates an additional software-based conversion unit that performs the software-based conversion process when a state where at least one of the plurality of software-based conversion units waits for the hardware-based image processing apparatus to complete the specific image processing occurs.

2. The print document conversion apparatus according to claim 1, wherein the controller controls the additional software-based conversion unit to execute the specific image processing by itself without requesting the hardware-based image processing apparatus to perform the specific image processing.

3. The print document conversion apparatus according to claim 1, wherein the controller further limits a number of software-based conversion units that are to request the hardware-based image processing apparatus to execute the specific image processing to a value that is determined based on a processing capability of the hardware-based image processing apparatus.

4. A non-transitory computer readable medium storing a program causing a computer to execute a process comprising:
executing a plurality of software-based conversion units that perform a software-based conversion process for converting print document data described in a page description language into page image data having a bitmap image format, each of the plurality of software-based conversion units requesting a hardware-based image processing apparatus that executes specific image processing in the software-based conversion process to execute the specific image processing, and generating the page image data including a result of the specific image processing executed by the hardware-based image processing apparatus in response to the request; and
activating an additional software-based conversion unit that performs the software-based conversion process when a state where at least one of the plurality of software-based conversion units waits for the hardware-based image processing apparatus to complete the specific image processing occurs.

5. A print document conversion method comprising:
executing a plurality of software-based conversion units that perform a software-based conversion process for converting print document data described in a page description language into page image data having a bitmap image format, each of the plurality of software-based conversion units requesting a hardware-based image processing apparatus that executes specific image processing in the software-based conversion process to execute the specific image processing, and generating the page image data including a result of the specific image processing executed by the hardware-based image processing apparatus in response to the request; and
performing control to activate an additional software-based conversion unit that performs the software-based conversion process when a state where at least one of the plurality of software-based conversion units waits for the hardware-based image processing apparatus to complete the specific image processing occurs.

* * * * *